(12) United States Patent
Köster et al.

(10) Patent No.: US 11,365,918 B2
(45) Date of Patent: Jun. 21, 2022

(54) DEVICE FOR STORING REFRIGERANT OF A REFRIGERANT CIRCUIT SYSTEM AND METHOD FOR OPERATING THE DEVICE

(71) Applicant: Hanon Systems, Daejeon (KR)

(72) Inventors: Stephan Köster, Langerwehe (DE); Dominik Sernetz, Alpen (DE)

(73) Assignee: HANON SYSTEMS, Daejeon (KR)

( * ) Notice: Subject to any disclaimer, the term of this patent is extended or adjusted under 35 U.S.C. 154(b) by 275 days.

(21) Appl. No.: 16/546,402

(22) Filed: Aug. 21, 2019

(65) Prior Publication Data
US 2020/0064029 A1    Feb. 27, 2020

(30) Foreign Application Priority Data

Aug. 22, 2018 (DE) .......................... 102018120467.1

(51) Int. Cl.
| | | |
|---|---|---|
| F25B 43/00 | (2006.01) | |
| B60H 1/32 | (2006.01) | |
| F16K 31/00 | (2006.01) | |
| F25B 43/02 | (2006.01) | |

(52) U.S. Cl.
CPC ............. *F25B 43/006* (2013.01); *B60H 1/32* (2013.01); *F16K 31/002* (2013.01); *F25B 43/02* (2013.01); *B60H 1/3214* (2013.01); *B60H 2001/3286* (2013.01); *F25B 2309/061* (2013.01); *F25B 2700/2105* (2013.01)

(58) Field of Classification Search
CPC ...... F25B 43/02; F25B 43/006; F25B 31/004; F25B 2700/2105; F16K 31/002
See application file for complete search history.

(56) References Cited

U.S. PATENT DOCUMENTS

| | | | | |
|---|---|---|---|---|
| 5,029,455 A | * | 7/1991 | Backus | .................. F25B 43/02 |
| | | | | 62/470 |
| 5,052,193 A | * | 10/1991 | Pettitt | ................... F25B 43/006 |
| | | | | 62/503 |
| 5,479,786 A | * | 1/1996 | Giasson | ............... G05D 23/025 |
| | | | | 62/222 |

(Continued)

FOREIGN PATENT DOCUMENTS

| | | |
|---|---|---|
| CN | 103075567 A | 5/2013 |
| CN | 206786115 U | 12/2017 |

(Continued)

*Primary Examiner* — Christopher R Zerphey
(74) *Attorney, Agent, or Firm* — Shumaker, Loop & Kendrick, LLP; James D. Miller

(57) ABSTRACT

A device for storing refrigerant of a refrigeration circuit and a method of operating the device, in particular for an air conditioning system of a motor vehicle. The device has a housing having a volume-enclosing wall with an inlet for introducing a refrigerant-oil mixture, and an outlet, a refrigerant discharge line arranged in the interior of the housing with an inlet opening arranged above a liquid level of the refrigerant for receiving gaseous refrigerant, and a system for returning oil to a compressor having at least one through hole formed below the liquid level of the refrigerant, in particular below a filling level of the oil, in the refrigerant discharge line. In addition, at least one through hole formed in the refrigerant discharge line is formed with an adjustable through-flow cross section, which can be varied by means of a closing apparatus.

8 Claims, 7 Drawing Sheets

(56) References Cited

U.S. PATENT DOCUMENTS

Figure 1:
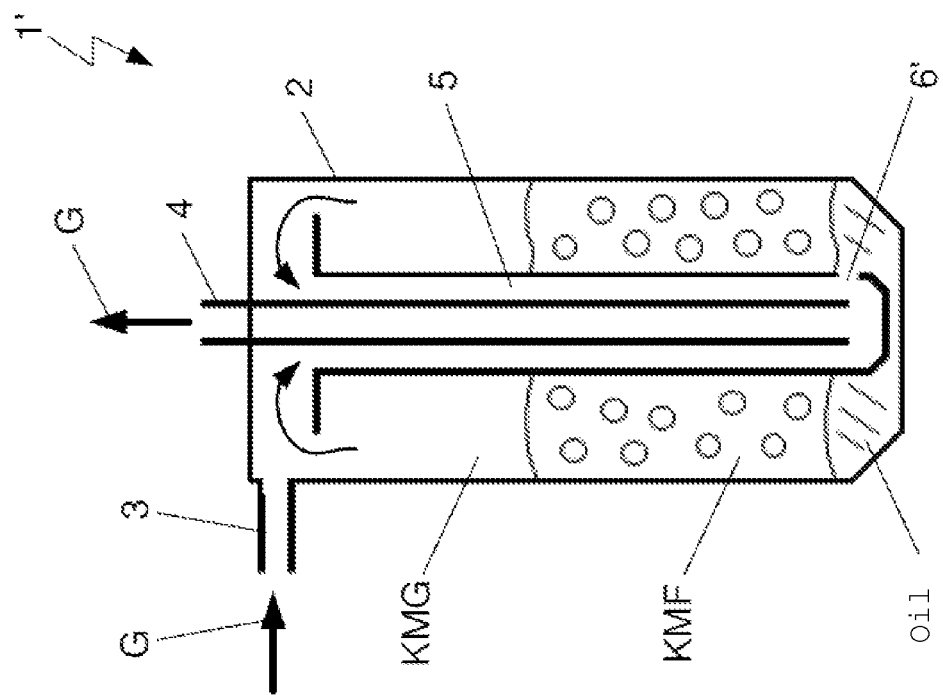

| | | | |
|---|---|---|---|
| 5,970,738 A | 10/1999 | DeNolf et al. | |
| 6,526,765 B2* | 3/2003 | Lifson | F25B 31/004 |
| | | | 62/468 |
| 7,685,839 B2* | 3/2010 | Gu | F25B 40/00 |
| | | | 62/503 |
| 9,377,248 B2* | 6/2016 | Yoon | F28F 1/00 |
| 9,726,173 B2* | 8/2017 | Celata | F16K 15/16 |
| 2005/0262873 A1* | 12/2005 | Hirota | F25B 41/20 |
| | | | 62/503 |
| 2010/0224267 A1* | 9/2010 | Flomenblit | G05D 23/025 |
| | | | 137/468 |

FOREIGN PATENT DOCUMENTS

| | | |
|---|---|---|
| CN | 108317785 A | 7/2018 |
| DE | 102007039753 A1 | 2/2009 |
| JP | H06137719 A | 5/1994 |
| JP | 2001201213 A | 7/2001 |
| JP | 2005241068 A | 9/2005 |
| JP | 2005337592 A | 12/2005 |
| KR | 19990018328 U | 6/1999 |
| KR | 2020000013545 U | 7/2000 |
| KR | 100577240 B1 | 5/2006 |
| KR | 20090016821 A | 2/2009 |

\* cited by examiner

DEVICE FOR STORING REFRIGERANT OF A REFRIGERANT CIRCUIT SYSTEM AND METHOD FOR OPERATING THE DEVICE

CROSS-REFERENCE TO RELATED PATENT APPLICATION

This patent application claims priority to German Patent Application No. DE 10 2018 120 467.1 filed Aug. 22, 2018, the entire disclosure of which is hereby incorporated herein by reference.

FIELD

The invention relates to a device for storing refrigerant of a refrigeration circuit, in particular for an air conditioning system of a motor vehicle. The invention also relates to a method of operating the device.

BACKGROUND

Conventional refrigeration circuits, in particular cold vapor compression refrigeration circuits are operated, for example, in air conditioning systems or refrigeration systems with various refrigerants, such as partially or fully halogenated fluorocarbons, short HFC or FC, or natural substances such as carbon dioxide, as working fluids. In this case, the refrigeration circuits are often formed with devices for separating and storing refrigerant, which receive additional refrigerant to compensate, among other things, refrigerant inevitably escaping from the refrigeration circuit within the maintenance interval. In addition, the amount of refrigerant circulating in the refrigeration circuit depends on the operating state of the refrigeration circuit. The difference quantity between the existing refrigerant and refrigerant necessary for the respective operation is stored temporarily within the device for storing the refrigerant.

In an arrangement of the device in the low pressure region of a refrigeration circuit, in the flow direction of the refrigerant between a heat exchanger operated as an evaporator and a compressor, the device is also referred to as an accumulator, and in an arrangement of the device in the high pressure region of the refrigeration circuit, in the flow direction of the refrigerant after a heat exchanger operated as a condenser/gas cooler, the device is also referred to as a collector.

In automotive applications, the refrigeration circuit, as a component of an air conditioning system, is used primarily for conditioning, in particular cooling the supply air for the passenger compartment in summer. At low ambient temperatures, the supply air for the passenger compartment is heated by means of waste heat of the internal combustion engine which is cooled by means of a coolant circulating in a coolant circuit.

The increasing electrification of motor vehicles eliminates the waste heat of internal combustion engines for heating the supply air for the passenger compartment, especially in the winter months. However, since the heating of the supply air with only electrical energy significantly reduces the range of electrically powered motor vehicles, the refrigeration circuits, which are operated for cooling the supply air in particular in the summer, are increasingly used in winter as a heat pump.

Since refrigeration circuits using carbon dioxide as the refrigerant are at least equally good as refrigeration circuits using conventional HFCs as refrigerant when operating in refrigeration mode with respect to performance and efficiency, and are far superior when operating in heating mode, carbon dioxide as a refrigerant becomes increasingly more prevalent in the course of the electrification of motor vehicles.

Since the refrigerant in the liquid state is stored in the device for storing, the refrigerating machine oil circulating in the refrigeration circuit is always stored in the device and has several functions within the refrigeration circuit. The oil is used on the one hand to lubricate movable components arranged within the compressor and thus reduces the friction between the components, which are formed in particular as metal parts. This reduces wear on the compressor. On the other hand, the sealing of the compressor relative to the surroundings and the internal seal between the high pressure region and the low pressure region of the refrigerant within the compressor is improved by means of the oil. Another function of the oil within a refrigeration circuit is to absorb and dissipate the heat generated, for example, due to the friction between the moving components of the compressor within the compressor.

In order to supply sufficient oil to the compressor and thus to prevent a failure of the compressor, the oil, which is usually heavier than the liquid refrigerant and accumulates in the region of a bottom of the accumulator, is drawn from the accumulator by means of a U-tube or J-tube which partially extends at the bottom. The tube has at the lowest point, in particular in the region of the vertex of the U-shape or J-shape, a small through hole for introducing the oil into the tube.

An accumulator of the type described above is known from U.S. Pat. No. 5,970,738 A. The accumulator has a tube of J-shaped design at the outlet side for drawing refrigerant from the gas phase and oil from the liquid phase, which tube is arranged within a housing of the accumulator and can contact at least partially a liquid phase of the fluid.

Within the extended operating range of the refrigeration circuit on the one hand for cooling the supply air during operation in the refrigeration mode, and on the other hand for heating the supply air for the passenger compartment when operating in heat pump mode, the oil has significantly different material properties. In particular, a high variance in the viscosity of the oil involves the risk that a system formed inside the accumulator for returning the oil to the compressor during operation in the refrigeration mode or in the heat pump mode does not function equally reliably.

On the one hand, a too high a viscosity of the oil can lead to an insufficient lubrication of the compressor, which translates into increased wear and/or premature failure of the compressor. On the other hand, too low a viscosity of the oil can cause the system for returning the oil to draw large quantities of liquid refrigerant from the accumulator together with the oil. Drawing larger amounts of the liquid refrigerant prevents storage of the liquid in the accumulator. This can significantly reduce the efficiency of the operation of the refrigeration circuit. In addition, liquid slugging caused by the liquid refrigerant drawn into the compressor can destroy the compressor.

While in subcritical process control, the arrangement of the device for storing the refrigerant with the system for returning the oil to the compressor in both the low pressure region as an accumulator and in the high pressure region as a collector is possible, an arrangement of the device in transcritical process control, as for example with carbon dioxide as a refrigerant, as a collector is not possible, so known from the prior art systems for returning the oil, that is systems for returning the oil known from the prior art, i.e., systems with a partially arranged U-tube or J-tube extending at the bottom with a through hole for introducing the oil in the tube, can not be used.

SUMMARY

The object of the invention is now to provide a device for storing refrigerant in a refrigeration circuit, in particular an accumulator, with a system for returning oil in order to ensure sufficient lubrication of a compressor with the oil. The system for returning oil is to be designed to equally reliably return oil from the device for storing refrigerant of the accumulator to the compressor at high oil viscosity values and low oil viscosity values without risking operating the refrigeration circuit with the device at inefficient or inoperable operating conditions at low viscosity values of the oil. The device should be compact and and enable an efficient and safe operation of the refrigeration circuit in particular also at low viscosity values of the oil. In addition, the cost of manufacturing, maintenance and installation of the device should be minimal.

The object is achieved by the subject matter with the features disclosed herein.

The object is achieved by a device according to the invention for storing refrigerant of a refrigeration circuit, especially for an air conditioning system of a motor vehicle. The device has a housing having a volume-enclosing wall with an inlet for introducing a refrigerant-oil mixture into an upper region of the housing, and an outlet. In the interior of the housing, a refrigerant discharge line is formed with an inlet opening for receiving gaseous refrigerant arranged above a liquid level of the refrigerant. The device also has a system for returning oil to a compressor of the refrigeration circuit having at least one through hole formed below the liquid level of the refrigerant, in particular below a filling level of the oil, in the refrigerant-discharging line.

The lower region of the housing of the device is used for the most part preferably to store the liquid refrigerant, while the upper region is preferably provided for introducing the refrigerant and for separating the liquid from the vapor phase of the refrigerant and for discharging the refrigerant in particular in vapor form. Advantageously the oil of the refrigerant-oil mixture flowing into the housing is collected in the lower region.

According to the concept of the invention, at least one through hole for drawing oil formed in the refrigerant discharge line has an adjustable through-flow cross section. Here, the through-flow cross section of the through hole can be varied by means of a closing apparatus.

The closing apparatus is advantageously formed to be deformable in a temperature dependent manner or arranged to be movable in a temperature dependent manner.

According to a further development of the invention, the closing apparatus is rigidly connected at a first end to the refrigerant-discharging line. Here, a second end formed distally to the first end and freely moveable relative to the refrigerant discharge line is arranged in the region of the through hole.

According to a first alternative embodiment of the invention, the closing apparatus is formed as a strip-shaped, in particular a planar sliding element. The second end of the sliding element is moveably arranged along the refrigerant discharge line.

The strip form is understood to mean an elongated, narrow, ribbon-like form. The flat form indicates a parallel arrangement of the surfaces, without elevations on the surfaces. The surfaces are located opposite to one another and peripherally connected to one another at side edges.

The sliding element may be arranged with the largest expansion in an axial direction to the refrigerant discharge line, in particular, parallel to the axis of the refrigerant discharge line, or helically wound around the refrigerant discharge line.

In particular, the helically wound sliding element has the shape of a cylindrical coil spring, wherein the spring element is formed in strip shape, and the side edges of the strip are arranged to each other.

According to a second alternative embodiment of the invention, the closing apparatus is formed as a strip-shaped bi-metal element. The second end of the bi-metal element is moveably arranged in the radial direction relative to the refrigerant discharge line. In this case, the bi-metal element is arranged with the greatest expansion in an axial direction relative to the refrigerant discharge line, in particular parallel to the axis of the refrigerant discharge line.

According to a further alternative embodiment of the invention, the closing apparatus is formed as a disc-shaped bi-metal element, which is loosely fixed or routed on a peripheral edge. A center of the disc is arranged to be freely movable relative to the refrigerant discharge line in the region of the through hole.

In this case, a body in the form of a cylinder whose radius is many times greater than its thickness is understood to be a disc. The disc is thus preferably formed as a circular disc.

The respective bi-metal element has preferably a action temperature of about −10° C. and a hysteresis of about 8 K.

According to a further alternative embodiment of the invention, the closing apparatus is formed as an expansion element which has a closing element and a hermetically sealed expansion member for moving the closing element. In this case, a fluid that changes the volume in a temperature dependent manner is arranged within the expansion element.

The expansion member is advantageously fixed at a first side within the housing, in particular on the wall of the housing. The closing element is arranged at a second side of the expansion member opposite the first side.

According to a further alternative embodiment of the invention, the closing apparatus is formed as a valve, which has a closing element and an actuator for moving the closing element. In this case, the actuator is formed to be controllable via an electric magnetic element.

The closing element of the closing apparatus, which is formed as an expansion element or as a valve, is preferably formed as a truncated cone. In this case, the closing element is fixedly connected at a base surface to the second side of the expansion member or to the actuator and arranged with a cover surface oriented in the direction of the through hole.

An axis of rotation of the closing element and a central axis of the through hole are advantageously arranged congruently to one another. The closing element is preferably continuously movable between two end positions.

Another advantage of the invention is that the refrigerant discharge line is formed as a coaxial tube or in the form of a bent tube, in particular as a J-shaped tube or as a U-shaped tube. The at least one through hole with adjustable through-flow cross section is arranged in the formation of the refrigerant discharge line as a coaxial tube in the region of a lower end and in the formation of the refrigerant discharge line as a bent pipe in the region of the vertex of the curvature.

The refrigerant discharge line is preferably formed as an outlet routed out of the housing.

According to a further development of the invention, the device for storing refrigerant has a refrigerant supply line entering the housing above a liquid level of the refrigerant in addition to the refrigerant discharge line arranged in the interior of the housing. The device is also formed with a cover element arranged in the interior of the housing which cover element is arranged between the refrigerant supply line and the inlet opening of the refrigerant discharge line spaced to the inlet opening of the refrigerant discharge line in such a way that the inlet opening is protected from refrigerant flowing through the refrigerant supply line in the housing.

The cover can be used for the separation of the liquid phase and the vapor phase of the refrigerant. The formation of the cover element prevents refrigerant to be entrained as drops in the inlet opening of the refrigerant discharge line as a steam input, which would lead to a reduced separation function and a reduced storage function of the device.

The device according to the invention for storing refrigerant can advantageously be used for various refrigerants. Appropriately, the housing and the refrigerant-carrying lines should be formed from a material resistant to refrigerants, in particular to the refrigerants R134a, R1234yf, R744, R600a, R290, R152a, R32 and their mixtures, and oil. An advantageous material is aluminum or an aluminum alloy, since aluminum has a high mechanical stability, low weight and good resistance. Internal lines and fixtures of the device may alternatively also be formed of a plastic, so that in particular complex elements for mounting, such as elements of valves, can be produced simply and inexpensively.

The advantageous embodiment of the invention enables the formation of a refrigeration circuit with a device according to the invention for storing refrigerant, in particular for an air conditioning system of a motor vehicle. The device is conceptually arranged as an accumulator between a heat exchanger operated as an evaporator of the refrigerant and a compressor.

It should be noted that the refrigeration circuit can advantageously be operated both in the mode of a compression refrigeration system or in a refrigeration mode as well as in the mode of a heat pump or in a heating mode.

The object is also achieved by a method of operating the device according to the invention for storing refrigerant. In this case, at low temperatures of the refrigerant and the closing apparatus, a large cross section of a through hole formed in a refrigerant discharge line is unblocked and a large mass flow of oil is drawn into the refrigerant discharge line, while at high temperatures of the refrigerant and the closing apparatus, a small cross section of the through hole is unblocked and a small mass flow of oil is drawn into the refrigerant discharge line. The specification of the low temperatures and the high temperatures are to be understood as relative to one another.

According to a further development of the invention, a closing element is moved via a magnetic element and an actuator in a temperature dependent manner and/or a pressure dependent manner linearly along a central axis of the through hole between two end positions. Alternatively, the movement may also be possible only to the end positions.

The device according to the invention for storing refrigerant with the system for returning oil is configured to automatically increase the through-flow cross section of the through hole for drawing the oil out of the housing or unblock, for example, a second through hole for drawing the oil at high viscosity of the oil.

Here, the physical relationship is used that the value of the viscosity of oil is usually large at low temperatures, such as during operation of the refrigerant cycle in a heating mode, and small at high temperatures, such as during operation of the refrigerant cycle in a refrigeration mode. With the respective closing apparatus as an active element, which also is used as a sensor, the temperature of the refrigerant is used as a control variable.

In a wide operating range or wide range of evaporation temperatures, such as a range between −40° C. to +20° C. and beyond the range, refrigeration circuits in operation which rely on an accumulator as a refrigerant storage, can be operated safely, reliably and efficiently with the device for returning the oil despite the accompanying changes in the viscosity of the refrigerator oil as a lubricant for the compressor over several orders of magnitude of the value of the viscosity of the oil, since the device for returning the oil always ensures a safe return of the oil from the accumulator, in particular to the compressor of the refrigeration circuit.

DRAWINGS

Figure 2A:
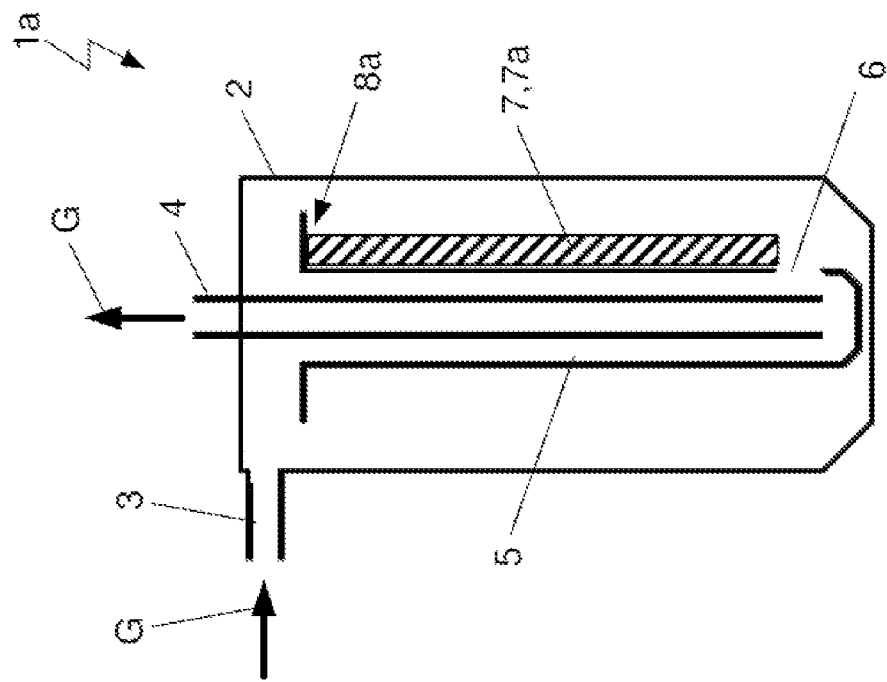
Figure 2B:
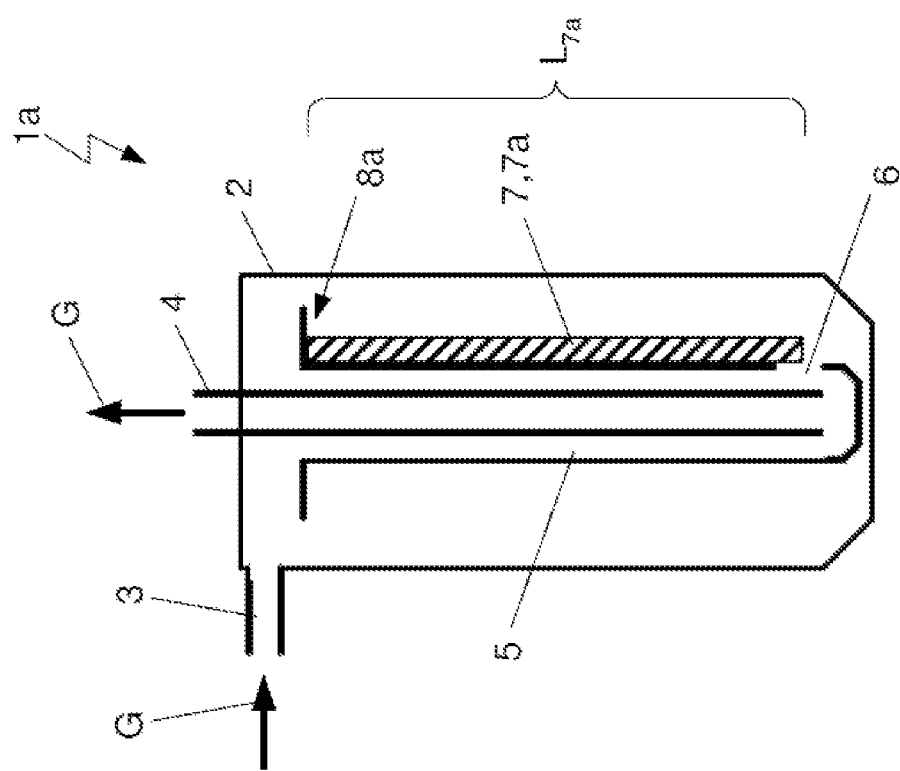
Figure 3A:
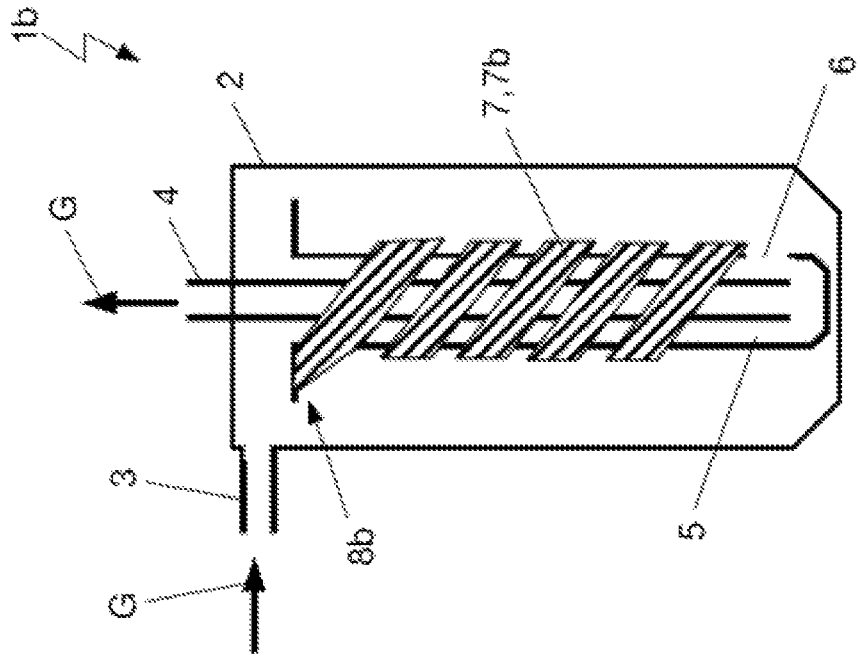
Figure 3B:
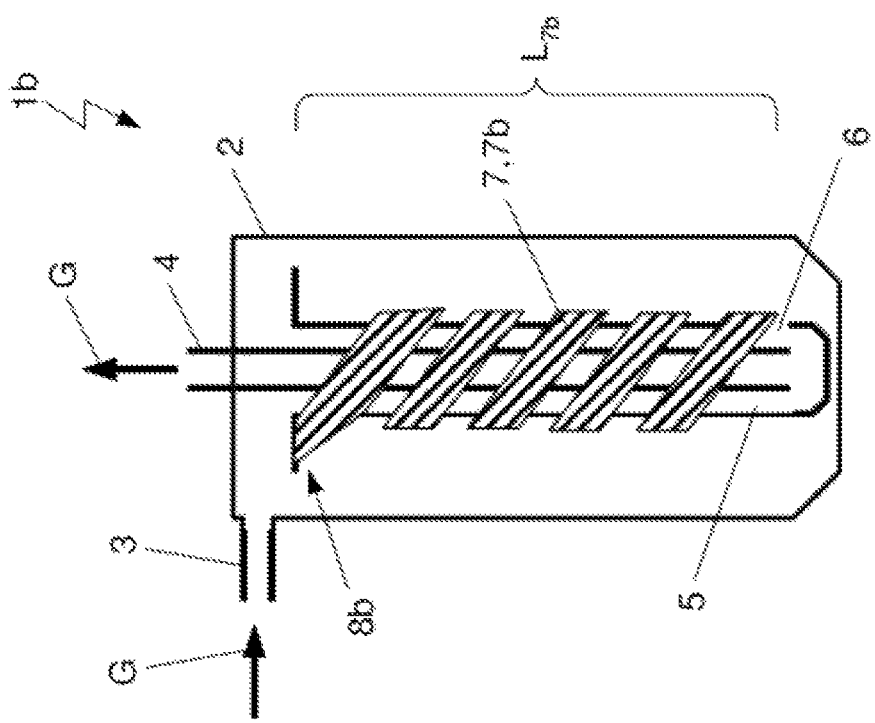
Figure 4A:
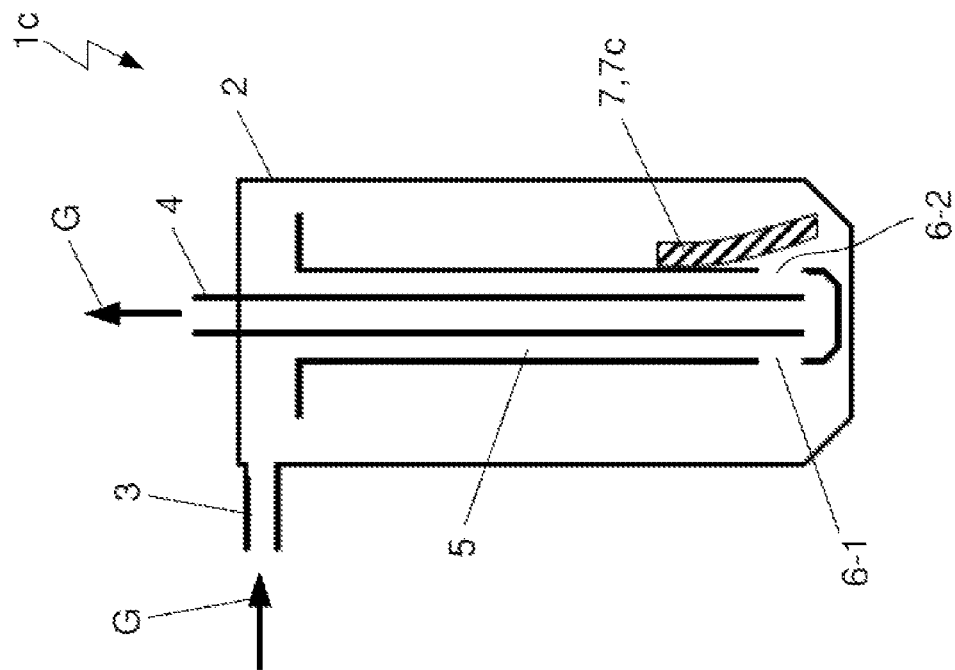
Figure 4B:
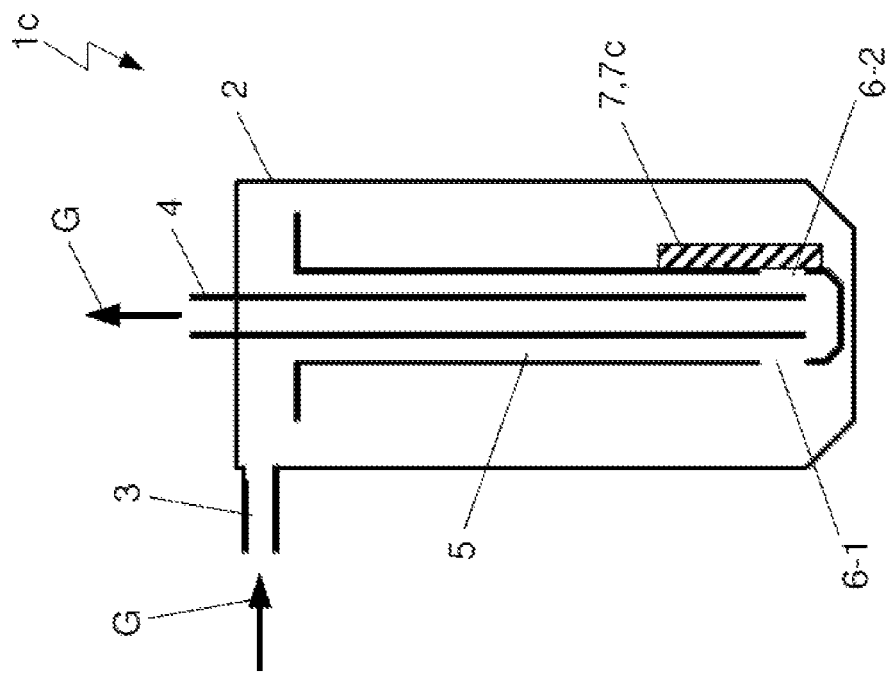
Figure 5A:
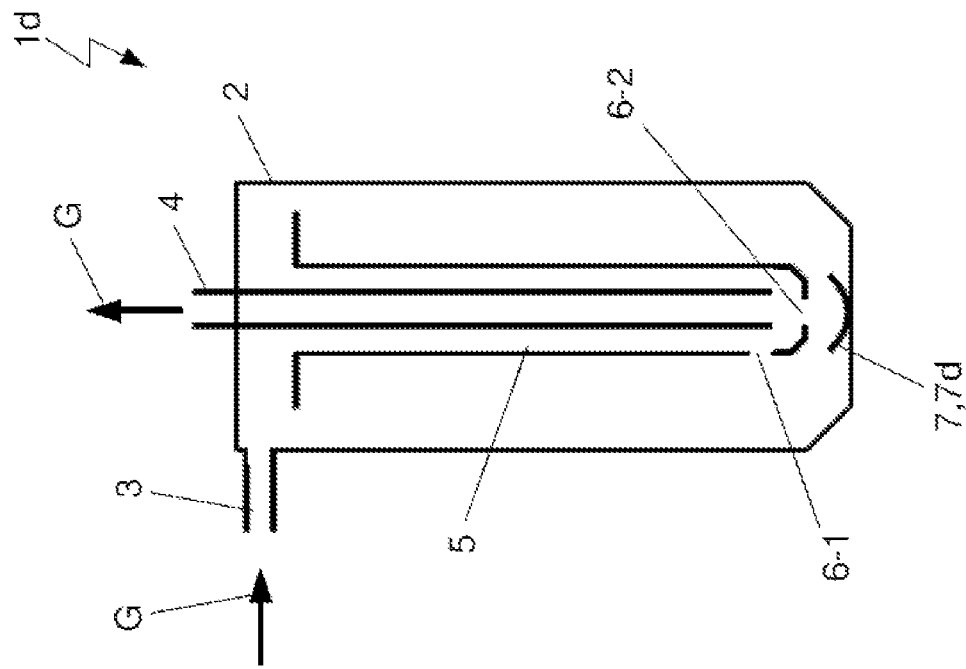
Figure 5B:
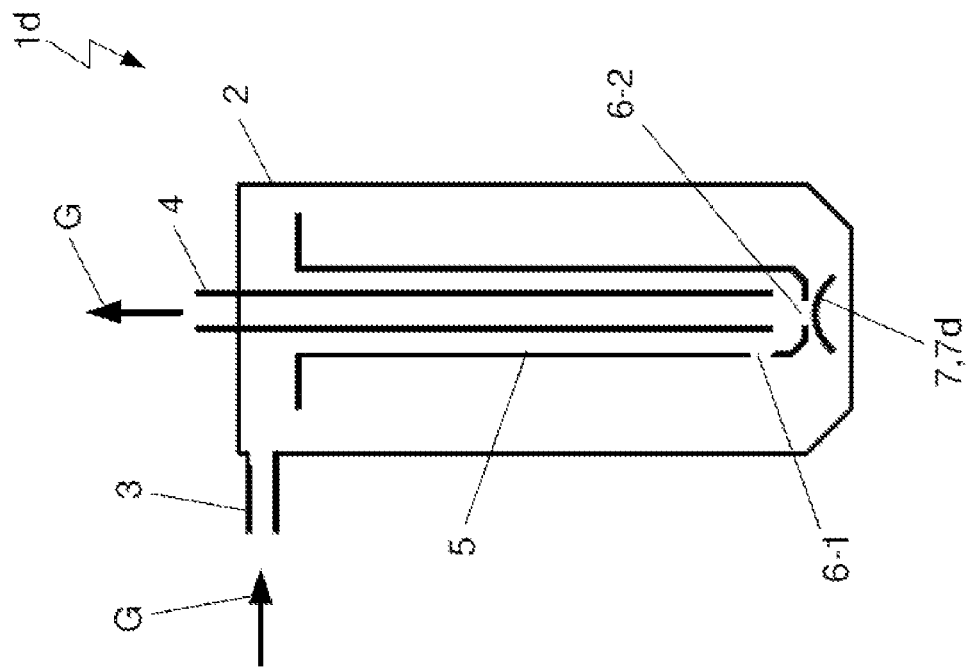
Figure 6A:
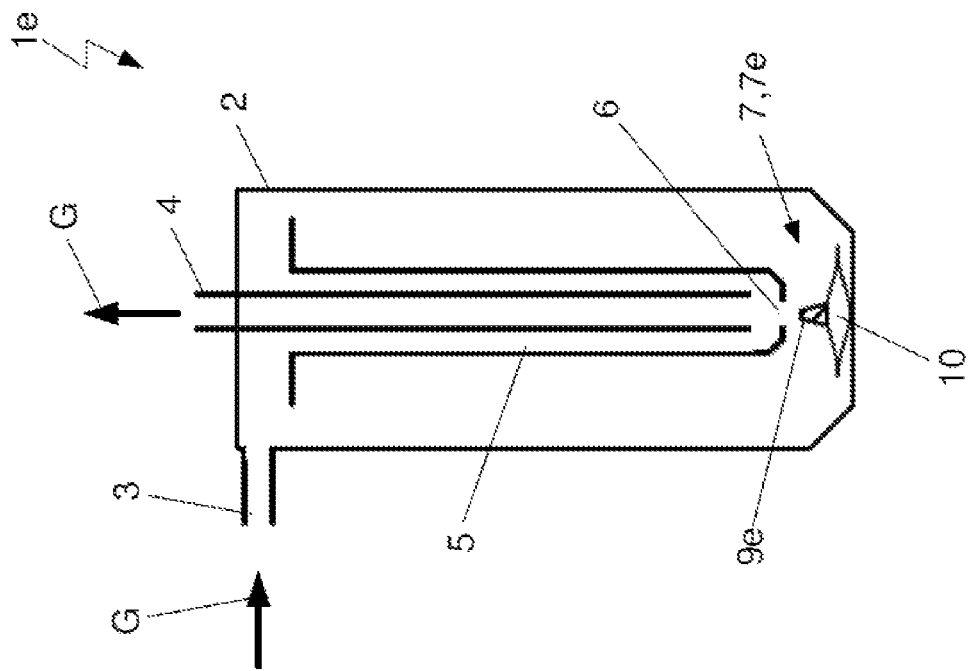
Figure 6B:
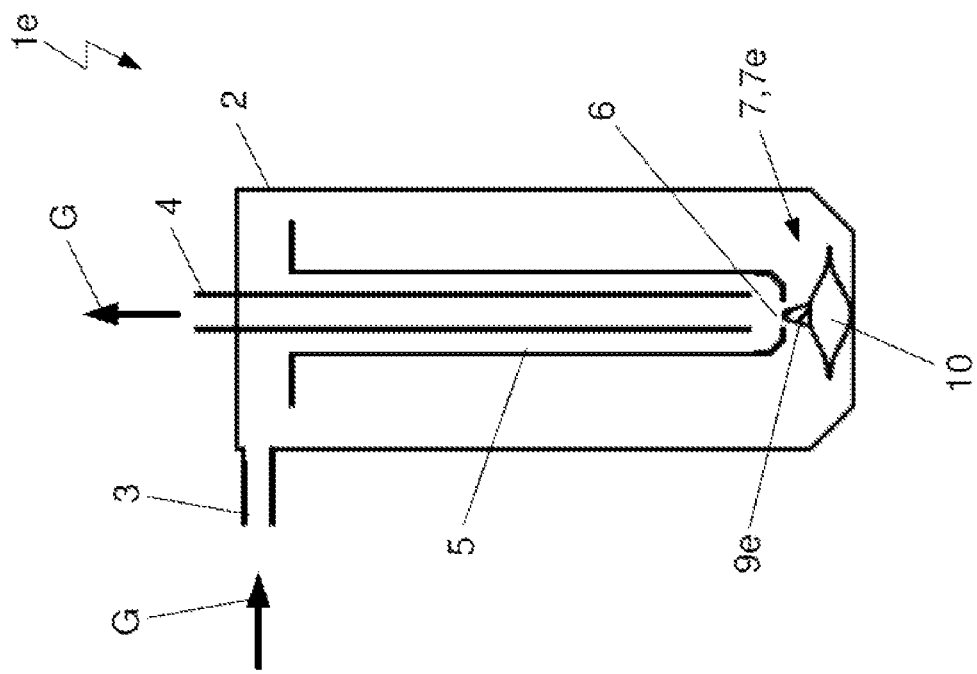
Figure 7A:
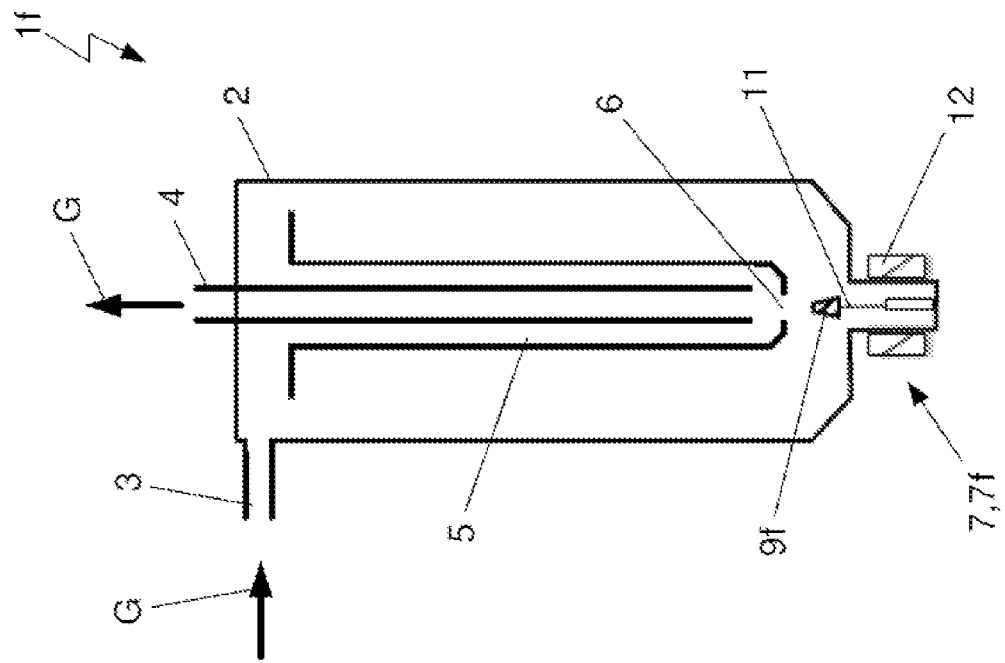
Figure 7B:
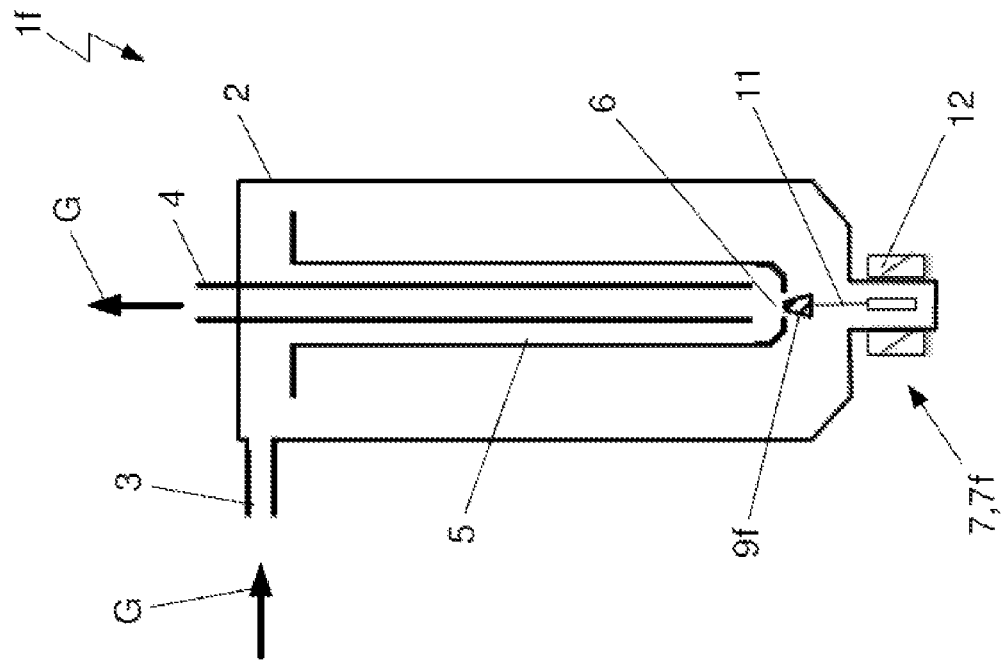

Further details, features and advantages of embodiments of the invention will become apparent from the following description of exemplary embodiments with reference to the accompanying drawings. The figures show a device that can be integrated within a refrigeration circuit for storing refrigerant with a system for returning oil to the compressor with a refrigerant discharge line having at least one through hole, in particular:

FIG. 1: in the prior art,

FIGS. 2A and 2B: with an axial sliding element as a closing apparatus of a single through hole in an at least partially closed and a fully open state of the through hole, FIGS. 3A and 3B: with a spirally wound axial sliding element as a closing apparatus of a single through hole in an at least partially closed and a fully open state of the through hole, FIGS. 4A and 4B: with a strip-shaped bi-metal element as a closing apparatus of at least one through hole in a closed and an open state of the through hole, FIGS. 5A and 5B: with a disc-shaped bimetal element as a closing apparatus of at least one through hole in a closed and an open state of the through hole FIGS. 6A and 6B: with an expansion element as a closing apparatus of a single through hole in an at least partially closed and a fully open state of the through hole, and FIGS. 7A and 7B: with a valve with a closing element as a closing apparatus of a single through hole in an at least partially closed and a fully open state of the through hole.

DETAILED DESCRIPTION

FIG. 1 shows a device 1', which can be integrated within a refrigeration circuit, for storing refrigerant with a system for returning oil to the compressor with refrigerant discharge line 5 having at least one through hole 6' of the prior art.

The refrigeration circuit not shown can have, in the flow direction of the refrigerant, the compressor for compressing gaseous refrigerant, at least one heat exchanger operated as a condenser or gas cooler in each case, an expansion body and a heat exchanger operated as an evaporator, in addition to the device 1' for storing refrigerant. Device 1' is preferably arranged as an accumulator between the evaporator and the compressor. Device 1' could be positioned as a collector at other locations of the refrigeration circuit, for example, on the high pressure side after the condenser or gas cooler.

When the refrigerant is liquefied with carbon dioxide in subcritical operation, such as, for example, with the refrigerant R134a or under certain environmental conditions, the heat exchanger for dissipating heat from the refrigerant is called a condenser. A portion of the heat transfer takes place at constant temperature. In supercritical operation or supercritical heat dissipation in the heat exchanger, the temperature of the refrigerant steadily decreases. In this case, the heat exchanger is also referred to as a gas cooler. Supercritical operation may occur under certain environmental conditions or operation modi of the refrigeration circuit with, for example, the refrigerant carbon dioxide.

Between the evaporator and the housing 2 of the device 1' formed as a collecting container for refrigerants, a refrigerant supply line 3 may be arranged, which opens as an inlet from above into housing 2 of device 1'. Through inlet 3, a refrigerant-oil mixture G is introduced into housing 2 of device 1'.

Refrigerant discharge line 5 formed in the form of a coaxial tube is arranged within housing 2, which line is routed as an outlet 4 out of housing 2. Refrigerant discharge line 5 is used to return the refrigerant-oil mixture G, particularly gaseous refrigerant KMG and oil, to the compressor of the refrigeration circuit. The gaseous refrigerant KMG is introduced into a jacket portion of the coaxial tube at a vertically upwardly oriented first open end face of an outer tube and routed within the jacket portion toward a vertically downwardly oriented first open end face of an inner tube. The first end face of the inner tube and a second end face of the outer tube are formed on a common bottom of the coaxial tube. The second end face of the outer tube is closed. The gaseous refrigerant KMG is introduced into the inner tube at the first, open end face and is discharged through the inner tube out of housing 2 of device 1'. The inner tube of the coaxial tube of the refrigerant discharge line 5 is routed as an outlet 4 through the wall of housing 2.

According to an alternative embodiment not shown, refrigerant discharge line 5 as a suction tube may be formed also as a J-shaped tube or as a U-shaped tube.

The inlet opening of refrigerant discharge line 5 is arranged above a level of the liquid refrigerant KMF, which represents the filling level of the refrigerant inside housing 2 as a phase boundary between the liquid refrigerant KMF and the gaseous refrigerant KMG. Since the inlet opening of refrigerant discharge line 5 is thus arranged in a region of housing 2 filled with gaseous refrigerant KMG, only gaseous refrigerant KMG is drawn into refrigerant discharge line 5 and removed through refrigerant discharge line 5 from housing 2.

Also, a cover element not shown can also be arranged in the interior of housing 2 of device 1' such that the inlet opening for the gaseous refrigerant KMG of refrigerant discharge line 5 is protected from undesirable ingress of refrigerant-oil mixture G flowing through inlet 3 into housing 2.

Refrigerant discharge line 5 has, in the lower region of the housing 2 and thus below the phase boundary between the liquid refrigerant KMF and the gaseous refrigerant KMG, in particular below a filling level of the oil, a through hole 6' through which a mass flow of the oil can be drawn, and, together with the gaseous refrigerant KMG can be removed as a refrigerant-oil mixture G from housing 2. Through hole 6' which is formed on a lateral surface of the outer tube of refrigerant discharge line 5 is also referred to as oil hole.

The individual components of device 1' are preferably formed of aluminum or of an aluminum alloy. In addition, all refrigerant-carrying lines connecting the components of the refrigeration circuit are advantageously formed of aluminum or an aluminum alloy.

Recurring features of FIG. 1 are provided in subsequent figures with the same reference numerals.

FIGS. 2A and 2B, respectively, show a first device 1a which can be integrated within a coolant circuit, for storing refrigerant with a system for returning oil to the compressor with a refrigerant discharge line 5 having a through hole 6. The system for returning oil of device 1a has a closing apparatus 7, formed as an axial sliding element 7a, of single through hole 6. FIGS. 2A and 2B show the system in an at least partially closed or fully open state of through hole 6 formed on the lateral surface of the outer tube of refrigerant discharge line 5.

Sliding element 7a, which is, in particular, strip-shaped, is formed of a material having a preferably large coefficient of thermal expansion in order to effect a large change in volume, in particular an expansion in the direction of a length L, as a function of temperature. Depending on the temperature and thus the expansion of sliding element 7a, a cross sectional area of through hole 6 of varying size is unblocked or covered by sliding element 7a.

Sliding element 7a is fixedly connected at a first end via a fixed bearing 8a to refrigerant discharge line 5. A second end of sliding element 7a which is freely movable in the direction of length L7a relative to refrigerant discharge line 5 and formed distally to the first end which is rigidly connected to refrigerant discharge line 5, is arranged in the region of through hole 6 for the oil. The first end of sliding element 7a is fixed in the region of the inlet opening of the refrigerant discharge line 5 for the gaseous refrigerant KMG in as large a distance as possible from through hole 6 in order to be able to make optimal use of the expansion of sliding element 7a when the temperature changes.

Sliding element 7a is oriented as a strip with the greatest expansion, that is to say length L7a, in the axial direction to refrigerant discharge line 5 which is formed as a coaxial tube and thus parallel to the axis of refrigerant discharge line 5. The designation of axial sliding element 7a with respect to the arrangement and the expansion in the axial direction thus relates to the axial orientation of the tubular refrigerant discharge line 5.

Sliding element 7a is formed of a material having such a coefficient of thermal expansion and a dimension in the direction of length L7a and fixed with the first end at a location on refrigerant discharge line 5 such that on the one hand at low temperatures of the refrigerant and thus low temperatures of sliding element 7a and a small dimension of sliding element 7a in the direction of length L7a, a large cross section of through hole 6 is unblocked. At a predetermined minimum temperature, in particular a minimum evaporation temperature of the refrigerant, the cross section of through hole 6 is fully open according to FIG. 2B, so that a maximum mass flow of oil is drawn into refrigerant discharge line 5. In this state the refrigeration circuit is preferably operated in a heating mode or heat pump mode.

On the other hand, at high temperatures of the refrigerant, sliding element 7a has a large dimension in the direction of length L7a, so that only a small cross section of through hole 6 according to FIG. 2A is unblocked and only a small mass flow of oil is drawn into refrigerant discharge line 5. A large part of the cross section of through hole 6 is covered by the expanded sliding member 7a. The refrigeration circuit is preferably operated in a refrigeration mode.

Closing apparatus 7 is specifically formed as an axial sliding element 7a according to FIGS. 2A and 2B when the temperature-dependent change of the dimension of sliding member 7a in the direction of length L7a is sufficient due to the thermal expansion for the required and desired change in length for at least partially opening and closing through hole 6 in the designed temperature range of the operation of device 1a.

FIGS. 3A and 3B, respectively, show a second device 1b which can be integrated within a coolant circuit, for storing refrigerant with a system for returning oil to the compressor with a refrigerant discharge line 5 having a through hole 6. The system for returning oil, in an alternative embodiment of the axial sliding element 7a of device 1a of FIGS. 2A and 2B, has a closing apparatus 7 which is formed as axial sliding element 7b, of single through hole 6. FIGS. 3A and 3B show the system again in an at least partially closed or fully open state of through hole 6.

The embodiment of device 1b of FIGS. 3A and 3B is based essentially on the properties of the embodiment of device 1a of FIGS. 2A and 2B. Thus, sliding element 7b, which is, in particular strip-shaped, is also formed of a material with a large coefficient of thermal expansion in order to effect a large change in volume, in particular an expansion in the direction of a length L, as a function of temperature, and, depending on the temperature or the expansion of sliding element 7b, to unblock or close a cross sectional area of through hole 6 of varying size. However, unlike sliding element 7a of device 1a, sliding element 7b of the system for returning oil of device 1b is formed as a spirally or helically strip wound around refrigerant discharge line 5. Thus, the length of sliding element 7b is $$L7b = \pi \cdot D \cdot n$$

wherein D is the outer diameter of refrigerant discharge line 5 and n is the number of windings around refrigerant discharge line 5. Sliding element 7b of device 1b, therefore, has a longer length L7b than sliding element 7a of device 1a, especially due to the number of windings: L7b>L7a. Refrigerant discharge line 5 has the outer shape of a straight circular cylinder.

Closing apparatus 7 is specifically formed as a spiral sliding element 7b according to FIGS. 3A and 3B, when the temperature-dependent change in the dimension of sliding element 7b in the direction of length L7b due to the thermal expansion in a designed temperature range of operation or the length of refrigerant discharge line 5 due to the height of device 1b require a greater change in length for the at least partial opening and closing of through hole 6 than in device 1a.

Sliding element 7b is again formed of a material having such a coefficient of thermal expansion and a length L7b and fixed with the first end at refrigerant discharge line 5 via a fixed bearing 8b such that on the one hand at low temperatures of the refrigerant and thus low temperatures of sliding element 7b and a small dimension of sliding element 7b in the direction of length L7b, a large cross section of through hole 6 is open. On the other hand, at high temperatures of the refrigerant, sliding element 7b has a large dimension in the direction of length L7b, so that only a small cross section of through hole 6 is unblocked according to FIG. 3A, and only a small mass flow of oil is drawn into refrigerant discharge line 5. Through hole 6 is closed at least partially by means of the second end of sliding element 7b which is freely movable in the direction of length L7b relative to refrigerant discharge line 5 and formed distally to the first end which is rigidly connected to refrigerant discharge line 5.

FIGS. 4A and 4B show, respectively, a third device 1c which can be integrated within a coolant circuit, for storing refrigerant with a system for returning oil to the compressor with a refrigerant discharge line 5 having a first through hole 6-1 and a second through hole 6-2. The system for returning oil of device 1c has a closing apparatus 7 of second through hole 6-2 formed as a strip-shaped bi-metal element 7c. FIGS. 4A and 4B show the system in a completely closed or completely open state of second through hole 6-2.

First through hole 6-1 and second through hole 6-2 are formed below the filling level of the oil in a common horizontal plane on opposite sides of the outer tube of refrigerant discharge line 5. First through hole 6-1 has no closing element and is therefore always open for drawing in a mass flow of oil, while second through hole 6-2 is formed with closing element 7, 7c. By means of closing apparatus 7 formed as a strip-shaped bi-metal element 7c, which deforms as a function of temperature, second through hole 6-2 is open or closed depending on the temperature within housing 2.

For example, when the action temperature of the bi-metal of closing apparatus 7c is set to a value of −10° C. and the hysteresis for the shift is 8 K, the following states result for second through hole 6-2. With values of the temperature above −2° C., through hole 6-2 is closed, while with values of the temperature below −10° C., through hole 6-2 is open. At a value of the temperature of −2° C. or −10° C., bi-metal element 7c deforms, with through-hole 6-2 being closed at a value of the temperature of −2° C. and opened at a value of the temperature of −10° C.

In the case of values of the temperature of −10° C. and below −10° C. the refrigeration circuit is preferably operated in a heating mode or in a heat pump mode.

The materials of bi-metal element 7c are selected in terms of hysteresis such that within the hysteresis of closing apparatus 7c, that is to say in the range of temperature from −2° C. to −10° C., the changing vaporization temperature of the refrigerant does not lead to a change in the viscosity of the oil, which could be critical or unfavorable for the oil return.

Closing apparatus 7 which is formed as a strip-shaped bi-metal element 7c is oriented with the greatest expansion, that is to say a length, in an axial direction to refrigerant discharge line 5 which is formed as a coaxial tube and thus parallel to the axis of refrigerant discharge line 5.

Bi-metal element 7c is fixedly connected at a first end and in the vertical direction above second through hole 6-2 to refrigerant discharge line 5. A second end of bi-metal element 7c which is movable in a radial direction relative to refrigerant discharge line 5 and formed distally to the first end which is rigidly coupled to refrigerant discharge line 5, is arranged in the region of second through hole 6-2 for the oil. Upon reaching the action temperature of −10° C. or the temperature of −2° C. due to the hysteresis of 8 K, the bi-metal element 7c is deformed such that bi-metal element 7c either, according to FIG. 4A, abuts second through hole 6-2 on the wall of refrigerant discharge line 5, and thus second through hole 6-2 is closed, or, according to FIG. 4B, protrudes around second through hole 6-2 from the wall of refrigerant discharge line 5 and thus second through hole 6-2 is open to draw in a larger mass flow of oil.

FIGS. 5A and 5B disclose, respectively, a fourth device 1d which can be integrated within a coolant circuit, for storing refrigerant with a system for returning oil to the compressor with a refrigerant discharge line 5 having a first through hole 6-1 and a second through hole 6-2. The system for returning oil of device 1d has a closing apparatus 7 of second through hole 6-2 formed as a disc-shaped bi-metal element 7d. FIGS. 5A and 5B show the system in a completely closed or completely open state of second through hole 6-2.

The embodiment of the device 1d from FIGS. 5A and 5B is based essentially on the properties of the embodiment of the device 1c of FIGS. 4A and 4B. Thus, the bi-metal element 7d which is, in particular, disc-shaped, is also formed to effect at least a partially opening or closing a second through hole 6-2 as a function of temperature.

However, unlike bi-metal element 7c of device 1c, bi-metal element 7d of the system for returning oil of device 1d is disc-shaped. In addition, through-holes 6-1, 6-2 are not arranged on a common horizontal plane. While first through hole 6-1 is formed without change at a lateral surface of the outer tube of refrigerant discharge line 5, second through hole 6-2 is provided on the second end face of the outer tube.

In contrast to strip-shaped bimetal element 7c of device 1c, which is fixedly connected at a first end to refrigerant discharge line 5, and the second end is freely movable, disk-shaped bimetallic element 7d of device 1d is radially loosely fixed or routed at the peripheral edge. Bi-metal element 7d is movable in the region of the center of the disc.

Disc-shaped bimetal element 7d, according to FIG. 5A, is deformed for values of the temperature above −2° C. such that second through hole 6-2 is closed, while bi-metal element 7d, according to FIG. 5B, is deformed at values of the temperature below −10° C. opening through hole 6-2. Upon reaching the threshold values of the temperature of −2° C. or −10° C., bi-metal element 7d deforms, with second through hole 6-2 being closed at a value of the temperature of −2° C. and opened at a value of the temperature of −10° C. In the closed state of through-hole 6-2, disc-shaped bi-metal element 7d is deformed in the central region upward in the vertical direction and abuts the wall of refrigerant discharge line 5 around second through hole 6-2. In the opened state of through hole 6-2, disc-shaped bi-metal element 7d is deformed in the central region downward in the vertical direction and projects from the wall of refrigerant discharge line 5.

FIGS. 6A and 6B, respectively, show a fifth device 1e which can be integrated within a coolant circuit, for storing refrigerant with a system for returning oil to the compressor with a refrigerant discharge line 5 having a through hole 6. The system for returning oil of device 1e has a closing apparatus 7, formed as an expansion element 7e, of single through hole 6. FIGS. 6A and 6B show the system in an at least partially closed or fully open state of through hole 6.

In comparison to devices 1a, 1b, 1c, 1d shown in FIGS. 2 to 5, through hole 6 is not formed on the lateral surface of the outer tube but on the second end face of the outer tube of refrigerant discharge line 5.

Expansion element 7e has a hermetically sealed expansion member 10 and a closing element 9e. Expansion member 10 is filled with a particular fluid, the volume of which expands to a certain extent as a function of temperature. The volume of the fluid can change as a function of temperature with or without phase change of the fluid. With the volume change of the fluid, closing element 9e undergoes a certain stroke in the direction of through hole 6, which is small at low temperatures and large at high temperatures.

Expansion element 7e is arranged between the second end face of the outer tube of refrigerant discharge line 5 and the wall of housing 2 opposite the second end face of the outer tube of refrigerant discharge line 5. Expansion member 10 of expansion element 7e is positioned with a first side supporting on the wall of housing 2. With an expansion of the fluid arranged within expansion member 10, the stroke movement of expansion member 10 takes place in the direction of the second end face of the outer tube of refrigerant discharge line 5 and thus in the direction of through hole 6.

Expansion member 10 of expansion element 7e has, on a second side opposite the first side, conical, in particular frusto-conical closing element 9e, which is fixedly connected to the base surface with the second side of expansion member 10 and oriented with the cover surface in the direction of through hole 6. The axis of rotation of frusto-conical closing element 9e and the central axis of through hole 6 are oriented congruently.

Depending on the temperature and thus the expansion of the fluid within expansion member 10 and thus the stroke movement of expansion member 10 that takes place, a cross sectional area of through hole 6 of varying size is unblocked or closed by expansion element 7e.

At low temperatures of the refrigerant and thus low temperatures of the fluid within expansion member 10 and a small expansion of the fluid, on the one hand, a maximum cross section of through hole 6 is unblocked at a small stroke of expansion member 10. At a predetermined minimum temperature, in particular a minimum evaporation temperature of the refrigerant, the cross section of through hole 6 according to FIG. 6B is fully open, so that a maximum mass flow of oil is drawn into refrigerant discharge line 5. In the fully open state of closing apparatus 7e, closing element 9e is arranged in the vertical direction also with the cover surface below through hole 6. The refrigeration circuit is preferably operated in a heating mode or heat pump mode.

On the other hand, at high temperatures of the refrigerant and thus high temperatures of the fluid within expansion member 10 and a large expansion of the fluid at a large stroke of expansion member 10, only a minimal cross section of through hole 6 according to FIG. 6A is unblocked, so that only a small mass flow of oil is drawn into refrigerant discharge line 5. A large part of the cross section of through hole 6 is covered by closing element 9e, which is arranged with the cover surface projecting into through hole 6. The free cross section of through hole 6 is formed between the lateral surface of the frusto-conical closing element 9e and the edge of through hole 6. The refrigeration circuit is preferably operated in a refrigeration mode.

FIGS. 7A and 7B, respectively, show a sixth device 1f which can be integrated within a coolant circuit, for storing refrigerant with a system for returning oil to the compressor with a refrigerant discharge line 5 having a through hole 6. The system for returning oil of device 1f has a closing apparatus 7, formed as a valve 7f, of single through hole 6. FIGS. 7A and 7B show the system in an at least partially closed or fully open state of through hole 6.

As in device 1e of FIGS. 6A and 6B through hole 6 is formed on the second end face of the outer tube of refrigerant discharge line 5.

With respect to closing element 9e, 9f, the embodiment of device 1f of FIGS. 7A and 7B is also based on the properties of the embodiment of device 1e of FIGS. 6A and 6B. Thus, closing element 9f is also conical, in particular frusto-conical, with a free cross section of through hole 6 being provided between the lateral surface and the edge of through hole 6. Through hole 6 is opened or closed in a temperature-dependent manner with closing element 9f.

Valve 7f has, in addition to closing element 9f, an actuator 11 for moving closing element 9f and an electrically controllable magnetic element 12. Closing element 9f is continuously moved linearly along the central axis of through hole 6 via magnetic element 12 which is arranged outside housing 2 and actuator 11 in a temperature-dependent manner. In this case, closing element 9f undergoes a certain stroke in the direction of through hole 6, which is small at low temperatures and large at high temperatures.

Valve 7f is arranged between the second end face of the outer tube of refrigerant discharge line 5 and the wall of housing 2 opposite the second end face of the outer tube of refrigerant discharge line 5. Frusto-conical closing element 9f is fixedly connected at the base surface to actuator 11 and oriented with the cover surface in the direction of through hole 6. The axis of rotation of frusto-conical closing element 9f and the central axis of through hole 6 are oriented congruently.

Depending on the temperature and the stroke movement of actuator 11 with closure member 9f that takes place, a cross sectional area of through hole 6 of varying size is unblocked or closed by closing element 9f. At low temperatures of the refrigerant on the one hand a maximum cross section of through hole 6 is unblocked with a small stroke of closing element 9f. At a predetermined minimum temperature, in particular a minimum evaporation temperature of the refrigerant, the cross section of through hole 6 according to FIG. 7B is fully open. On the other hand, at high temperatures of the refrigerant and a large stroke of closing element 9f only a minimal cross section of through hole 6 is unblocked.

According to an alternative embodiment, not shown, the device for storing refrigerant with a system for returning oil to the compressor is formed with a refrigerant discharge line 5 having a first through hole 6-1 and a second through hole 6-2, similar to the devices 1c, 1d of FIG. 4A to 5B. In this case, first through hole 6-1 has no closing element and is thus always open for drawing a mass flow of oil, while second through hole 6-2 is formed with a valve 7f. Valve 7f has only two switching states for the closing element 9f instead of a continuous movement. In this case, second through hole 6-2 is closed in a first position at maximum stroke by means of closing element 9f and opened in a second position with a minimum stroke by means of closing element 9f.

LIST OF REFERENCE NUMERALS 1a, 1b, 1c, 1d, 1e, 1f, 1' device
2 housing
3 refrigerant supply line, inlet
4 outlet
5 refrigerant discharge line
6, 6' through hole of refrigerant discharge
6, 6' line 5
6-1 first through hole
6-2 second through hole
7 closing apparatus of through hole
7a, 7b closing apparatus, sliding element
7c closing apparatus, bi-metal element
7d closing apparatus, bi-metal element
7e closing apparatus, expansion element
7f closing apparatus, valve
8a, 8b fixed bearing sliding element 7a, 7b
9e, 9f closing element
10 expansion member
11 actuator valve 7f
12 magnetic element electrically
L length of sliding element 7a, 7b
G refrigerant-oil mixture
KMG refrigerant gaseous
KWF refrigerant liquid
Oil oil

What is claimed is:

1. A device for storing a refrigerant of a refrigeration circuit, the device comprising:
    a housing having a volume-enclosing wall with an inlet for introducing a refrigerant-oil mixture, and an outlet,
    a refrigerant discharge line arranged in an interior of the housing with an inlet opening arranged above a liquid level of the refrigerant for receiving gaseous refrigerant, and
    a system for returning oil to a compressor having at least one through hole formed below the liquid level of the refrigerant, in the refrigerant discharge line, wherein the at least one through hole formed in the refrigerant discharge line has an adjustable through-flow cross section, wherein the through-flow cross section of the at least one through hole can be varied by means of a closing apparatus, wherein the closing apparatus is formed as a strip-shaped sliding element, wherein the closing apparatus is rigidly connected at a first end to the refrigerant discharge line, and wherein a second end formed distally to the first end is freely movable relative to the refrigerant discharge line and is arranged in a region of the at least one through hole, wherein the first end of the closing apparatus is fixed in a region of the inlet opening of the refrigerant discharge line for the gaseous refrigerant distal from the at least one through hole, wherein the sliding element has a coefficient of thermal expansion sufficient to facilitate a fully open condition of the through-hole at a first predetermined temperature and at least partially closing the through-hole at a second predetermined temperature, and wherein the sliding element expands linearly parallel to a longitudinal axis of the refrigerant discharge line.

2. The device according to claim 1, wherein the closing apparatus is formed to be temperature-dependent deformable or is arranged to be temperature-dependent movable.

3. The device according to claim 1, wherein the second end is movably arranged along the refrigerant discharge line.

4. The device according to claim 3, wherein the sliding element is arranged with a largest expansion in an axial direction relative to the refrigerant discharge line.

5. The device according to claim 1, wherein the refrigerant discharge line is formed as a coaxial tube or in a form of a bent tube.

6. The device according to claim 1, wherein the refrigerant discharge line is formed as an outlet routed out of the housing.

7. A refrigeration circuit with a device according to claim 1, wherein the device is arranged as an accumulator between a heat exchanger operated as an evaporator of the refrigerant and the compressor.

8. A method for operating the device according to claim 1, the method comprising the steps of:
    unblocking a large cross section of the through hole formed in the refrigerant discharge line at lower temperatures of the refrigerant and the closing apparatus and drawing a large mass flow of oil into the refrigerant discharge line; and
    unblocking a smaller cross section of the through hole at higher temperatures of the refrigerant and the closing apparatus and drawing a small mass flow of oil into the refrigerant discharge line.

* * * * *